(12) United States Patent
Muchnic et al.

(10) Patent No.: US 6,558,824 B1
(45) Date of Patent: May 6, 2003

(54) FUEL CELL STACK REJUVENATION

(75) Inventors: Gregory Muchnic, Sinderd (IL); Uriel M. Oko, Glenmont, NY (US); Christopher S. Dannehy, Albany, NY (US)

(73) Assignee: Plug Power Inc., Latham, NY (US)

( * ) Notice: Subject to any disclaimer, the term of this patent is extended or adjusted under 35 U.S.C. 154(b) by 158 days.

(21) Appl. No.: 09/670,632

(22) Filed: Sep. 27, 2000

(51) Int. Cl.$^7$ ................................................ H01M 8/04
(52) U.S. Cl. ............................ 429/13; 429/17; 429/39
(58) Field of Search ............................. 429/13, 17, 39

(56) References Cited

U.S. PATENT DOCUMENTS 6,358,637 B1 * 3/2002 Fuss ............................ 429/12
6,368,737 B1 * 4/2002 Margiott et al. ............... 429/12
6,391,485 B1 * 5/2002 Perry ............................ 429/12

OTHER PUBLICATIONS

Voss et al., "Anode Water Removal: A Water Management and Diagnostic Technique for Solid Polymer Fuel Cells", Electrochimica Acta vol. 40, No. 3, pp 321–328, 1995 (no month available).*

* cited by examiner

*Primary Examiner*—Carol Chaney
(74) *Attorney, Agent, or Firm*—Trop, Pruner & Hu, P.C.

(57) ABSTRACT

A technique includes applying a vacuum to a manifold of a fuel cell stack to remove accumulated water from the stack. As an example, a fuel cell system may include a fuel cell stack that is capable of accumulating water. A vacuum system of the fuel cell system applies a vacuum to the fuel cell stack to remove at least some of the accumulated water.

29 Claims, 7 Drawing Sheets

FUEL CELL STACK REJUVENATION

BACKGROUND

The invention generally relates to fuel cell stack rejuvenation.

A fuel cell is an electrochemical device that converts chemical energy produced by a reaction directly into electrical energy. For example, one type of fuel cell includes a proton exchange membrane (PEM), often called a polymer electrolyte membrane, that permits only protons to pass between an anode and a cathode of the fuel cell. At the anode, diatomic hydrogen (a fuel) is reacted to produce hydrogen protons that pass through the PEM. The electrons produced by this reaction travel through circuitry that is external to the fuel cell to form an electrical current. At the cathode, oxygen is reduced and reacts with the hydrogen protons to form water. The anodic and cathodic reactions are described by the following equations:

$H_2 \rightarrow 2H^+ + 2e^-$ at the anode of the cell, and $O_2 + 4H^+ + 4e^- \rightarrow 2H_2O$ at the cathode of the cell.

A typical fuel cell has a terminal voltage near one volt DC. For purposes of producing much larger voltages, several fuel cells may be assembled together to form an arrangement called a fuel cell stack, an arrangement in which the fuel cells are electrically coupled together in series to form a larger DC voltage (a voltage near 100 volts DC, for example) and to provide a larger amount of power.

The fuel cell stack may include flow plates (graphite composite or metal plates, as examples) that are stacked one on top of the other, and each plate may be associated with more than one fuel cell of the stack. The plates may include various surface flow channels and orifices to, as examples, route the reactants and products through the fuel cell stack. Several PEMs (each one being associated with a particular fuel cell) may be dispersed throughout the stack between the anodes and cathodes of the different fuel cells. Electrically conductive gas diffusion layers (GDLs) may be located on each side of each PEM to form the anode and cathodes of each fuel cell. In this manner, reactant gases from each side of the PEM may leave the flow channels and diffuse through the GDLs to reach the PEM. The PEM and its adjacent pair are often assembled together in an arrangement called a membrane electrode assembly (MEA).

Over the lifetime of the fuel cell stack, the performance of the stack may gradually decrease due to the accumulation of water in the stack. In this manner, water may accumulate in flow channels in the cathode and anode regions of a particular fuel cell. This accumulated water at least partially blocks the flows channels and interfere with the flow of reactant gas between the flow channels and the MEA.

A possible way to remove the accumulated water is to disassemble the flow plates of the fuel cell stack to gain access to both sides of each fuel cell. However, such disassembly may consume a significant amount of time. Another way to remove accumulated water may be to blow gas (air or nitrogen, as examples) into a manifold inlet opening of the stack to create a differential pressure that causes the water to blow out of the corresponding manifold outlet manifold opening. However a problem with this technique is that the gas diffuses through the various orifices of the stack, thereby requiring high pressurization of the gas.

Thus, there is a continuing need for an arrangement and/or technique that addresses one or more of the problems that are stated above.

SUMMARY

In an embodiment of the invention, a technique includes applying a vacuum to a manifold of a fuel cell stack to remove accumulated water from the stack. As an example, a fuel cell system may include a fuel cell stack that is capable of accumulating water. A vacuum system of the fuel cell system applies a vacuum to the fuel cell stack to remove at least some of the accumulated water.

Advantages and other features of the invention will become apparent from the following description, from the drawing and from the claims.

DETAILED DESCRIPTION

Figure 1:
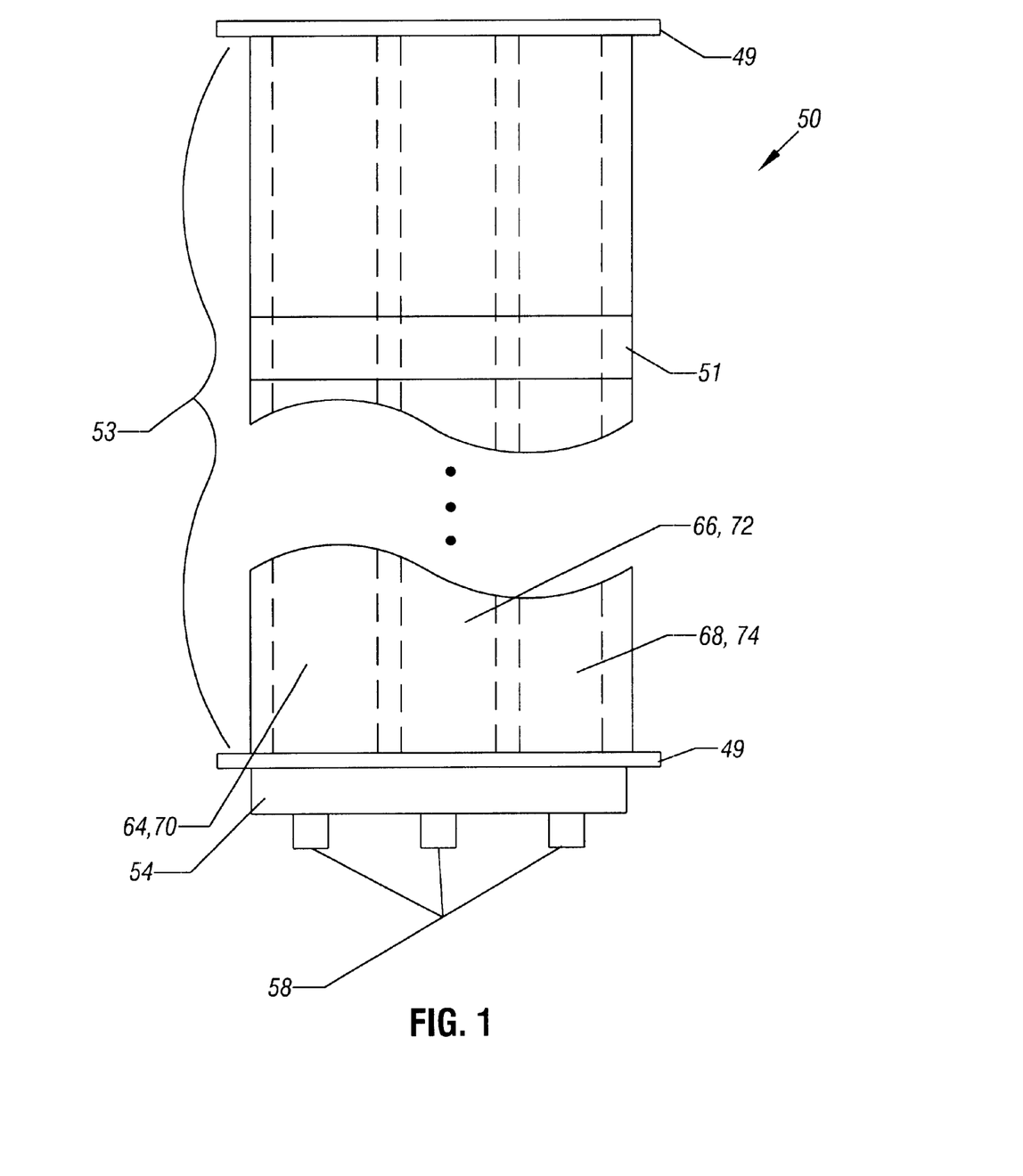
FIG. 1 is a front view of a fuel cell stack according to an embodiment of the invention.

Referring to FIG. 1, an embodiment 50 of a fuel cell stack in accordance with the invention includes flow plates 53 that are held in compression between end plates 49. The stack 50 also includes a manifold 54 that includes inlets and outlets 58 for communicating reactants and a coolant with the flow plates 53. An exemplary set 51 of the flow plates 53 is depicted in FIGS. 2 and 4 in more detail below, with the top view of the set 51 being depicted in FIG. 2.

More specifically, in particular, in some embodiments of the invention, the stack 50 may have fuel cells that are formed by two flow plates 53 of the stack 50. For example, as depicted in a cross-sectional view of the set 51 in FIG. 4, the exemplary set 51 includes four flow plates (anode cooler flow plates 53a that are interleaved with cathode cooler plates 53b) that form two fuel cells. It is to be noted that other designs are possible, such as designs that form each fuel cell from three flow plates, for example. However, for purposes of illustrating a specific embodiment of the invention, the two plate per fuel cell design is described below.

Figure 2:
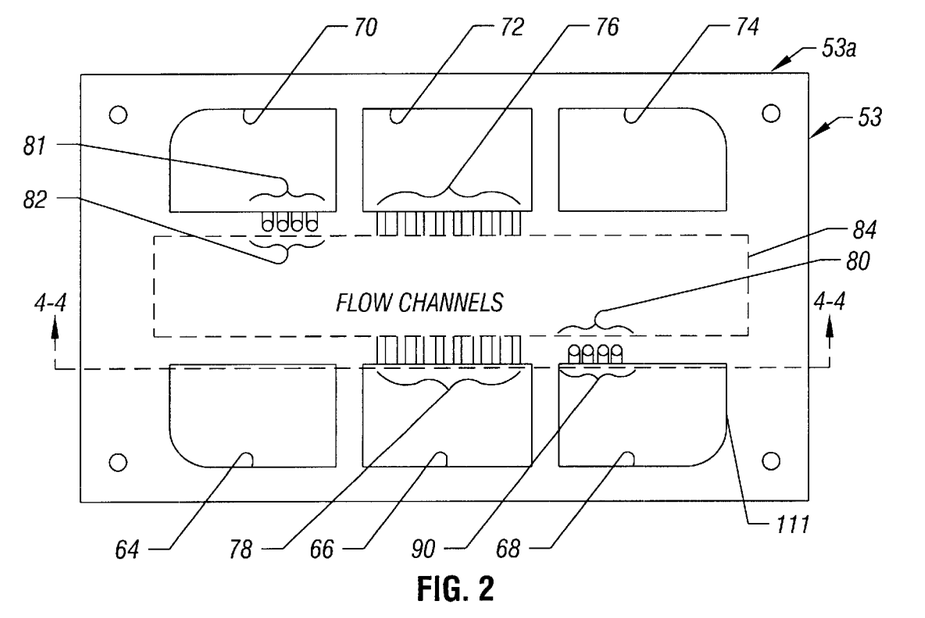
FIG. 2 is a top view of a portion of the fuel cell stack of FIG. 1 according to an embodiment of the invention.

FIG. 2 depicts a top view of the anode cooler flow plate 53a. As shown, the anode cooler plate 53a, similar to the other flow plates 53, include openings that form part of a manifold for communicating the reactants for the fuel cells and communicating a coolant to and from the various surface flow channels of the flow plates 53. In this manner, the flow plates 53 may include aligned openings that form a vertical inlet passageway 70 (see also FIG. 1) of the manifold for introducing fuel (hydrogen, for example) to the fuel cells of the stack 50, and the flow plates 53 may include aligned openings that form a vertical outlet passageway 68 of the manifold for removing hydrogen from the stack 50. Similarly, openings in the flow plates may form vertical inlet 74 and outlet 64 passageways of the manifold for communicating oxygen (via an air flow); and the flow plates 53 may include aligned openings that form vertical inlet 72 and outlet 66 passageways of the manifold for communicating the coolant.

Figure 3:
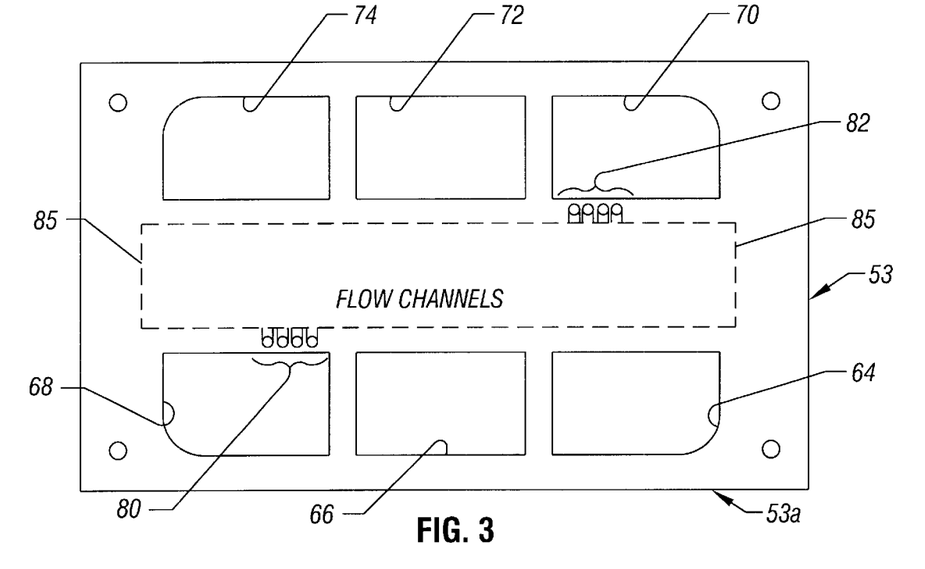
FIG. 3 is a bottom view of a flow plate of the section of the stack that is depicted in FIG. 2 according to an embodiment of the invention.
Figure 4:
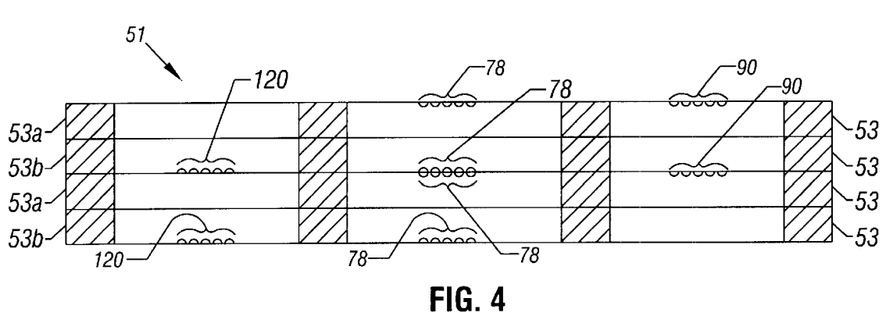
FIG. 4 is a cross-sectional view taken along line 4—4 of FIG. 2 according to an embodiment of the invention.

As an example of the fluid flows through the set 51 of flow plates 53 that are depicted in FIGS. 2 and 4, the anode cooler flow plate 53a may include horizontal flow channels 84 on its upper surface through which the coolant flows to remove heat from the stack 50. For purposes of furnishing fuel, such as hydrogen, to a membrane electrode assembly (MEA) (not shown) that is located between the anode cooler flow plate 53a and the cathode cooler flow plate 53b, the fuel flows through horizontal flow channels 85 (see an illustration of a bottom of the anode cooler flow plate 53a in FIG. 3) on the lower surface of the anode cooler flow plate 53a. Thus, the coolant flows through the upper surface flow channels 84 of the anode cooler flow plate 53a, and the fuel flows through the lower surface flow channels 85 of the anode cooler flow plate 53a.

The cathode cooler flow plate 53b has a similar design in which the flow channels for an oxidant are located on the upper surface of the flow plate 53b, and the flow channels for the coolant are located on the lower surface of the flow plate 53b. The flow coolant flow channels of each flow plate 53a and 53b pair mate to collectively form coolant flow channels that have approximately circular cross sections, in some embodiments of the invention.

To establish communication between the various horizontal flow channels and the vertical manifold passageways, the plates includes horizontal ports that are formed either in the upper or bottom surfaces of the plates. For example, referring to FIG. 4, to communicate with the hydrogen outlet passageway 68 (see also FIG. 2), the plates include sets 90 of horizontal outlet ports. Although the set 90 of ports is depicted in FIG. 4 as including five ports, the set 90 of ports may include fewer or more ports. To communicate with the coolant outlet passageway 66 (see also FIG. 2) and the oxygen outlet passageway 64 (see also FIG. 2), the plates includes sets 78 and 120, respectively, of horizontal outlet ports. The plates also include sets of horizontal inlet ports (not shown in FIG. 4) to communicate with the inlet manifold passageways 70, 72 and 74.

As an example, referring both to FIGS. 2 and 4, the upper surface of the anode cooler flow plate 53a includes a set 76 of horizontal outlet ports to receive water from the inlet passageway 72 and to communicate the coolant to the upper surface flow channels 84 of the anode cooler plate 62. In this manner, the coolant flows through the flow channels 84 to remove heat from the stack 50, and the coolant exits the flow channels 84 through a set 78 of horizontal outlet ports into the coolant outlet passageway 66. The upper surface of the anode cooler flow plate 53a also includes a set 81 of horizontal inlet ports that receive hydrogen from the hydrogen inlet passageway 70. Because the flow channels 85 (see FIG. 2) for the hydrogen are located on the lower surface of the anode cooler flow plate 53a, the anode cooler flow plate 53a includes vertical orifices 82 that extend through the plate 53a to route the incoming hydrogen into the flow channels 85. The hydrogen flows through the flow channels 85 and is subsequently routed to the upper surface of the flow plate 53a through vertical orifices 80. The hydrogen exits the plate 62 via a set 90 of horizontal outlet ports into the outlet passageway 68. Flows may be directed to the other plates of the set 51 of exemplary flow plates in a similar fashion.

Over time, water may accumulate in the flow channels of the stack 50 and saturate the GDLs. As an example, in some embodiments of the invention, there may be approximately sixteen flow channels to direct the flow of fuel for each anode cooler flow plate 53a and approximately sixteen flow channels to direct the flow of oxidant for each cathode cooler flow plate 53b. If a particular channel has even a short water obstruction (an obstruction of about 1 cm, for example) then the entire channel (a 30 cm channel, as an example for purposes of comparison) is blocked from routing the reactant gas.

Continuing this example, if two or more channels become blocked, then twelve percent or more of the cell's membrane area becomes dysfunctional, and if five or more channels are blocked, then thirty percent or more of the cell's membrane area becomes dysfunctional.

Figure 5:
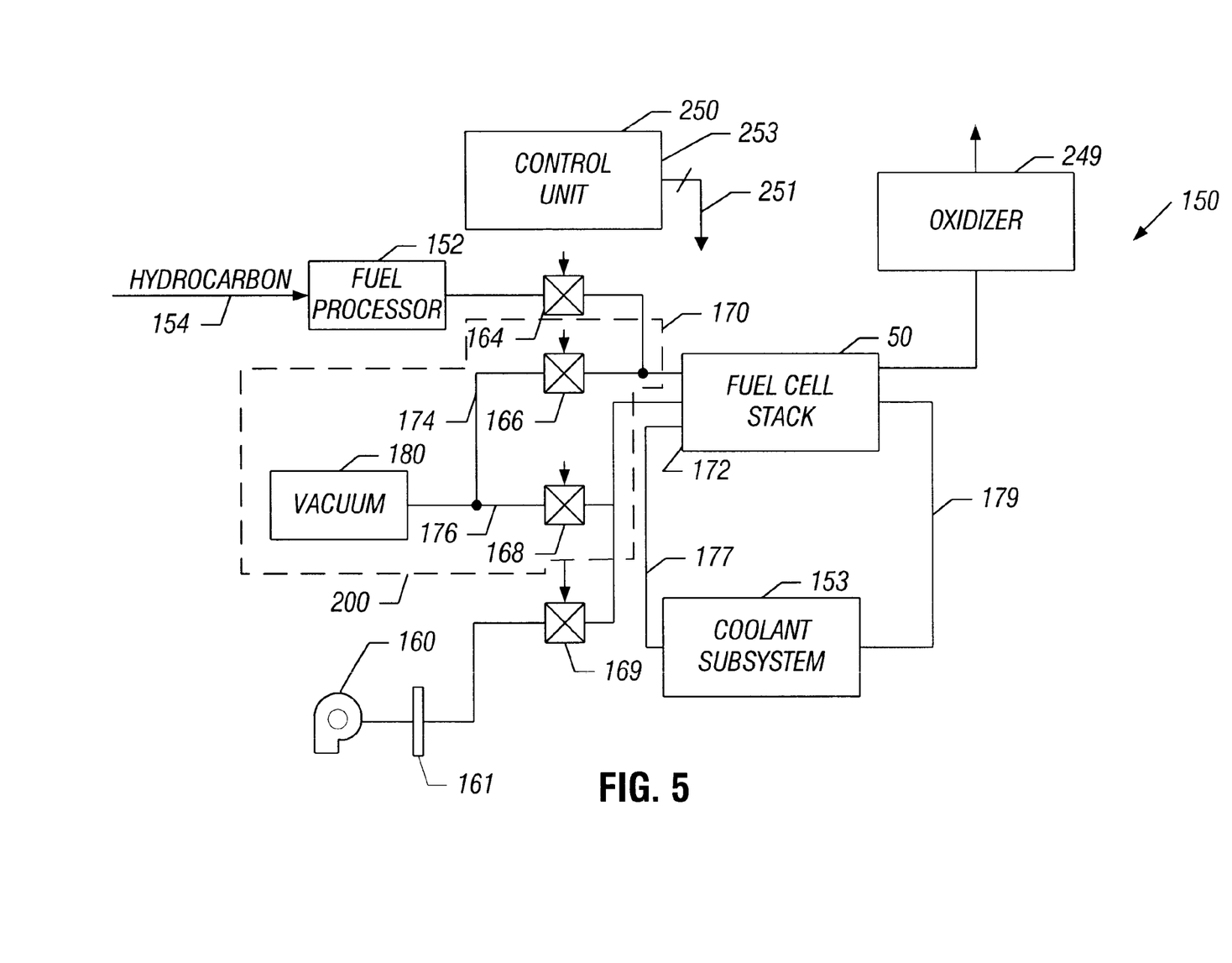
FIG. 5 is a schematic diagram of a fuel cell system according to an embodiment of the invention.

Referring to FIG. 5, for purposes of removing the accumulated water to restore performance of the fuel cell stack 50, in some embodiments of the invention, the stack 50 may be part of a fuel cell system 150 that is capable of removing the accumulated water from the stack 50, as described below. More specifically, the system 150 may include a vacuum system 200 and a coolant subsystem 153 that aid in the removal of the water, as described below.

Figure 6:
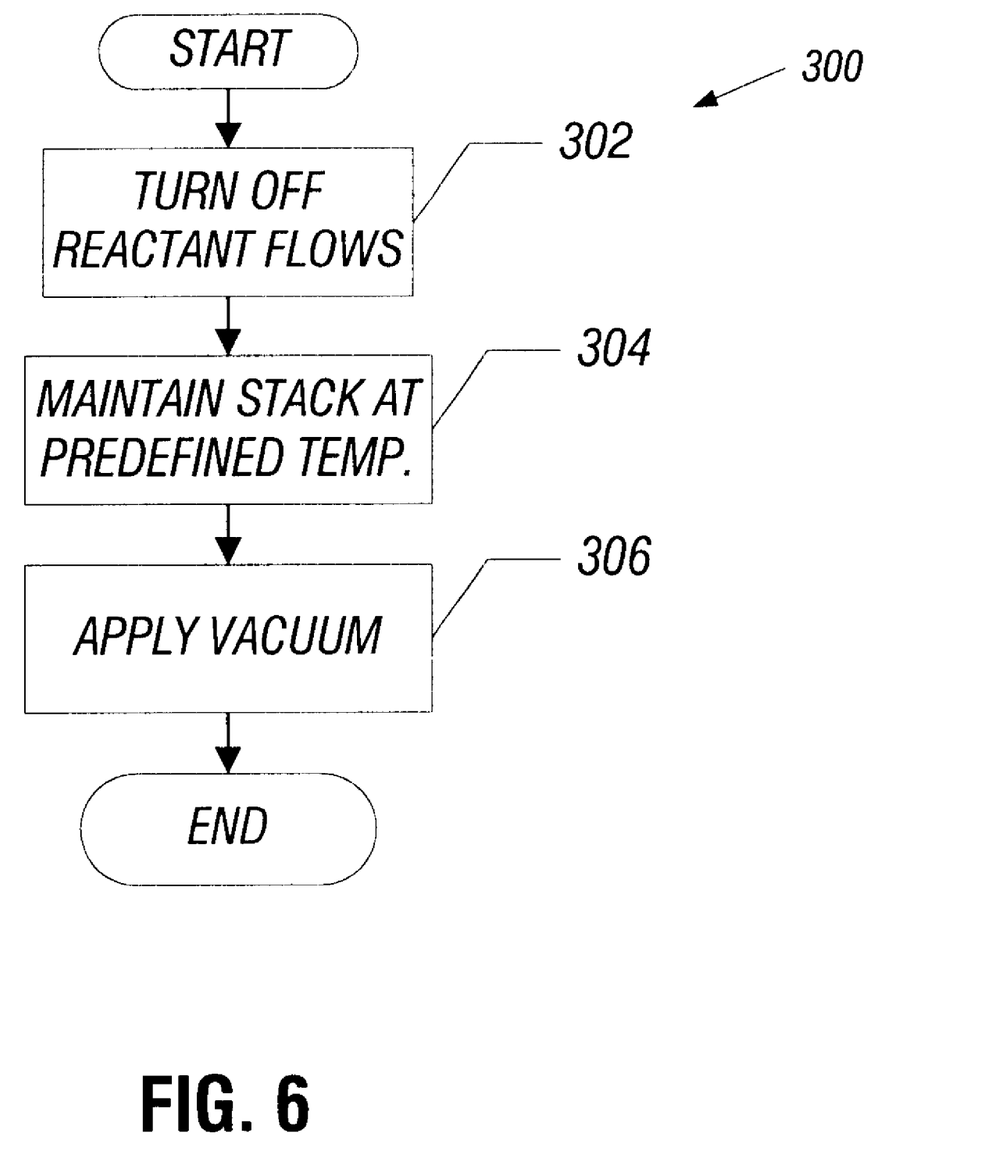
FIG. 6 is a flow chart depicting a technique to remove water from the fuel cell stack according to an embodiment of the invention.
Figure 7:
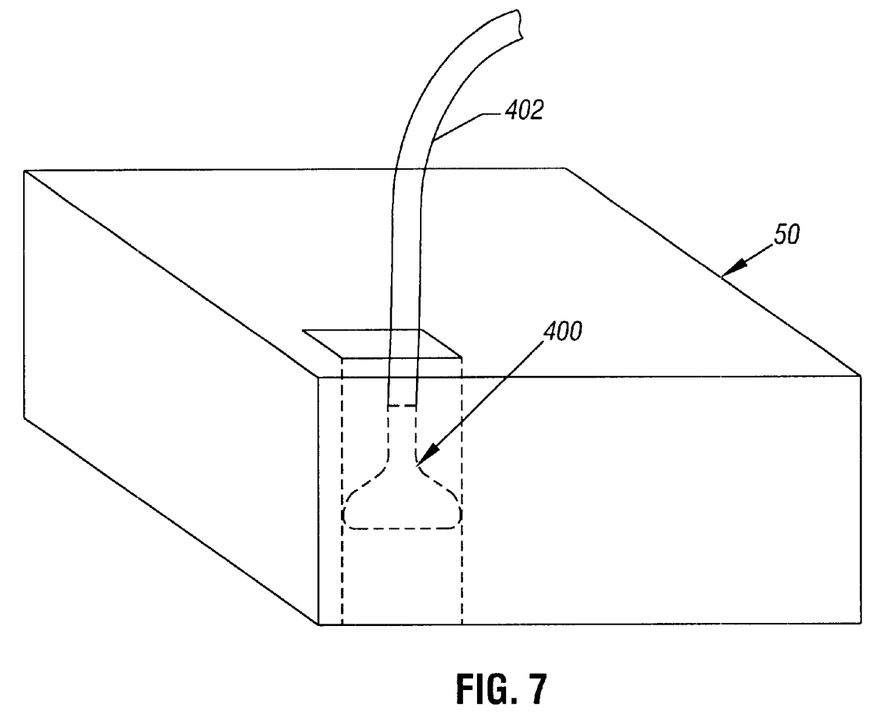
FIG. 7 is a perspective view of a fuel cell stack illustrating another technique to remove water from the fuel cell stack according to an embodiment of the invention.

As an example, to remove accumulated water from the stack 50, the system 150 may be used in conjunction with a technique 300 that is depicted in FIG. 6. In the technique 300, the reactant flows (fuel and oxidant flows) to the stack 50 are turned off, and while the reactant flows are turned off, the coolant subsystem 153 maintains (at block 304) the stack 50 at a predefined temperature (70° C., for example). At this predefined temperature, the water in the stack 50 has a large partial pressure such that when the vacuum system 200 applies a vacuum (block 306) to either reactant manifold passageway of the stack 50, the water boils off and is removed from the stack 50. Although 70° C. is given as an example, the stack 50 may be maintained at lower temperatures during the removal of the accumulated water. However, for these embodiments, the removal of the accumulated water may take additional time, as the partial pressure of the water is lower. Thus, in general, the higher the stack temperature, the faster is the rate at which the water is removed. The stack 50 may be maintained at a temperature greater than 70° C., in some embodiments of the invention.

In the context of this application, the phrase "applying a vacuum" generally refers to a lowering, or reduction, in the operating pressure of the stack. Thus, as an example, although the phrase "applying a vacuum" includes establishing an environment in which all gases have been removed, the phrase is not to be limited to this definition in this application.

Besides the fuel cell stack 50, the coolant subsystem 153 and the vacuum system 200, the fuel cell system 150 may include valves 164, 166, 168 and 169 that control connection of the vacuum system 200 to the fuel cell stack 50 and control flow of the reactants to the fuel cell stack 50. More particularly, in some embodiments of the invention, the valve 164 is connected between a fuel processor 152 (of the fuel cell system 150) and an input fuel hose 170 that is connected to the manifold 54 of the stack 50 to supply fuel (such as hydrogen) to the stack 50. In this manner, a control unit 250 (of the fuel cell system 150) may operate the valve 164 to maintain the valve 164 in an open state during the normal operation of the fuel cell system 150. The fuel inlet hose 170 is also connected to the vacuum system 200 via the valve 166. Therefore, when the vacuum system 200 is used to remove water from the anode regions of the fuel cell stack 50, the control unit 250 may operate the valve 164 to close the valve 164 to shut off the fuel flow to the stack 50 and operate the valve 166 to establish communication between a vacuum 180 of the vacuum system 200 and the fuel inlet hose 170. The control unit 250 also ensures that the valves 168 and 169 (described below) are closed during the removal of accumulated water from the anode regions of the stack 50. Next, the control unit 250 turns on the vacuum 180 to remove water from the stack 50 and concurrently operate the coolant subsystem 153 to maintain the stack 50 near the predefined temperature.

When the control unit 250 is finished removing accumulated water from the anode regions of the stack 50, the control unit 250 may then operate the valves 168 and 169 to remove accumulated water from the cathode regions of the stack 50. During the removal of the water from the cathode regions of the stack 50, the controller 250 keeps the valves 164 and 166 closed.

More specifically, the valve 169 controls communication of the oxidant between a blower 160 and an oxidant input hose 172 (both of the fuel cell system 150) that is connected to the manifold 54 of the fuel cell stack 50 to communicate the oxidant to the stack 50. The valve 166 controls communication between the hose 172 and the vacuum system 200. In this manner, the control unit 250 leaves the valve 169 open during the normal operation of the fuel cell system 150. However, for purposes of removing water from the cathode regions of the stack 50, the control unit 250 closes the valve 169 and opens the valve 168 that is coupled between the hose 172 and a hose 176 that leads to the vacuum 180 of the vacuum system 200. Thus, in the configuration, the control unit 250 may turn on the vacuum 180 to remove the water from the cathode regions of the stack 50 while maintaining the stack 50 near the predefined temperature.

The controller 250 may operates the valves to apply the vacuum to the stack 50 for a duration from less than one second to over thirty minutes, as an example. Thus, as an example, during the operation of the system 150, the controller 250 may, in some embodiments of the invention, periodically pulse, or momentarily turn on, the vacuum (by operating the valves, as described above) to remove accumulated water from the stack 50.

The vacuum 180 may include a vacuum tank, a tank that may be primed before the vacuum is applied to the fuel cell stack 50. In this manner, to prime the tank, gases may be withdrawn from the tank, so that when the tank is connected to the fuel cell stack 50, a vacuum is created to draw the accumulated water from the stack 50. For embodiments where the vacuum connection to the stack 50 is pulsed on and off, the controller 250 may prime the tank before the pulse is applied.

Among the other components of the fuel cell system 150, a filter 161 may be located to filter the air that is produced by the blower 160. The fuel cell system 150 may also include an oxidizer 249 to consume unconsumed fuel, and the fuel cell system may include additional valves to shut off other flows associated with the stack 50, such as the flow of unconsumed oxidant and fuel from the stack 50, for example. The fuel cell system 150 may also include other components (other control valves, water separators, etc.) that are not depicted in FIG. 5 for purposes of clarifying the technique 300.

In some embodiments of the invention, the vacuum 180, the hoses 174 and 176 and the valves 166 and 168 may be part of the vacuum system 200. As an example, the vacuum system 200 may be located on a cart so that when water needs to be removed from the fuel cell stack 50, the vacuum system 200 may be transported to the fuel cell system 150 for purposes of servicing the fuel cell stack 50. However, in other embodiments of the invention, the vacuum system 200 may be permanently installed in the fuel cell system 150 and periodically controlled by the control unit 250 (pursuant to the technique 300) to remove accumulated water from the anode and cathode regions of the fuel cell stack 50. In this manner, the control unit 250 includes control lines 253 to sense varies parameters of the fuel cell system 150 and control lines 251 to control, among other things, control operation of the fuel processor 152 and the valves 164, 166, 168 and 169.

Figure 8:
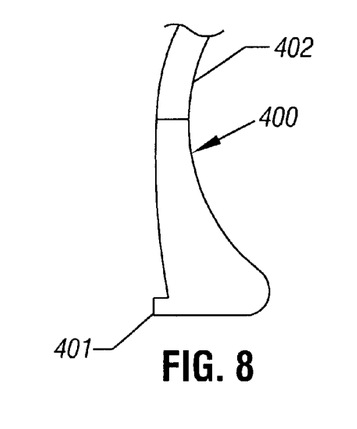
FIG. 8 is a side view of a vacuum wand that is depicted in FIG. 7 according to an embodiment of invention.

In some embodiments of the invention, the vacuum system is not coupled to the manifold 54 (see FIG. 1) of the fuel cell stack 50, but rather, a vacuum may be manually used to remove water from the fuel cell stack 50. For example, the manifold 54 of the fuel cell stack 50 may be removed, thereby exposing the inlet manifold passageways of the fuel cell stack 50. When these passageways are exposed, a vacuum wand 400 (depicted in more detail in FIG. 8) may be inserted through the passageway to form a vacuum at the various horizontal ports of the flow plates to allow water to be removed from the flow plates. Other arrangements are possible.

Figure 9:
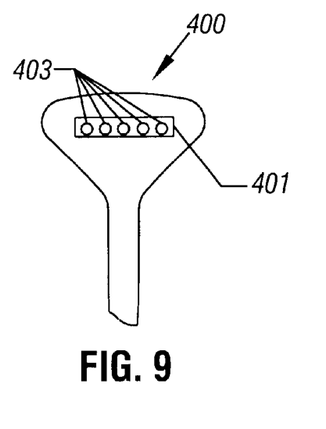
FIG. 9 is a front view of the vacuum wand according to an embodiment of the invention.

FIG. 9 depicts a front view of the wand 400. As shown, in some embodiments of the invention, the wand 400 may include an extension 401 (see also FIG. 8) that includes ports 403 to establish vacuum connections with the channels 403 of a particular flow plate. In this manner, the wand 400 is sized so that each port 403 is aligned with a different channel of the flow plate when the wand 400 is at the appropriate position inside the manifold passageway. In some embodiments of the invention, specific ports 403 may be blocked so that the vacuum may be applied to one or more selected flow channels of the flow plate. Although, five ports 403 are depicted in FIG. 9, the wand 400 may have more ports, depending on the number of channels of the flow plate.

Figure 10:
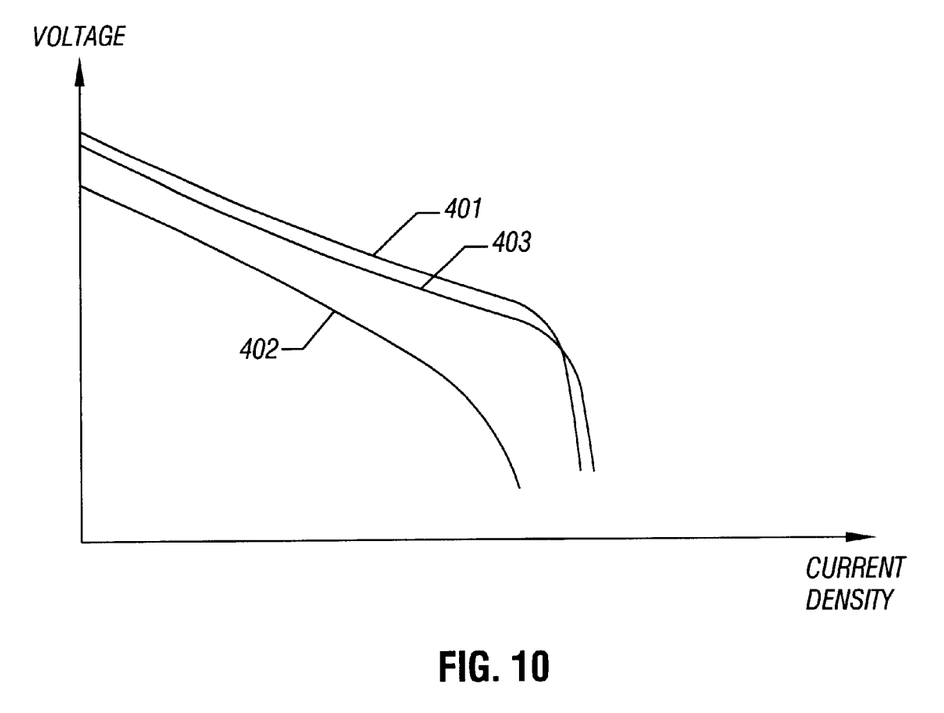
FIG. 10 illustrates polarization plots for a fuel cell before and after the accumulation of water according to an embodiment of the invention.

FIG. 10 depicts possible results of the technique 300 in the form of a polarization plot. As shown, before accumulating a significant amount of water, a typical cell in the fuel cell stack 50 may have a polarization curve 501 that is depicted in FIG. 10. However, when the cell becomes flooded, there is a drop in the current produced, as depicted by a curve 502 of FIG. 10. As an example, this drop may be similar to what is expected on the same cell had it been operating for 2000 hours. After the technique 300 is applied, the performance of the fuel cell improves, as depicted by the resulting polarization plot that is depicted by reference numeral 503.

In the preceding description, directional terms, such as "vertical" and "horizontal," were used for reasons of convenience to describe the fuel cell stack and its associated components. However, such orientations are not needed to practice the invention, and thus, other orientations are possible in other embodiments of the invention. For example, the fuel cell stack 50 and its associated components, in some embodiments, may be tilted by 90°.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method usable with a fuel cell system, the fuel cell system comprising a fuel cell stack that accumulates water produced by fuel cell reactions, the method comprising:

intermittently during operation of the fuel cell stack, applying a vacuum to the fuel cell stack to remove at least some of the accumulated water.

2. The method of claim 1, wherein the applying comprises:

connecting a vacuum system to a manifold of the fuel cell stack.

3. The method of claim 1, further comprising:

maintaining the fuel cell stack near a constant temperature.

4. The method of claim 3, wherein the maintaining the fuel cell stack near the constant temperature comprises:

regulating a coolant subsystem of the fuel cell system.

5. The method of claim 3, wherein the predefined temperature is near 70° C.

6. The method of claim 1, further comprising:

shutting off a reactant flow to the stack before applying the vacuum.

7. The method of claim 1, wherein the applying comprises:

applying the vacuum to anode regions of the stack.

8. The method of claim 1, wherein the applying comprises:

applying the vacuum to cathode regions of the stack.

9. The method of claim 1, wherein the applying comprises:

pulsing the vacuum to the fuel cell stack at regular intervals.

10. A fuel cell system comprising:

a fuel cell stack that accumulates water produced by fuel cell reactions; and a vacuum system to during the operation of the fuel cell stack, intermittently apply a vacuum to the fuel cell stack to remove at least some of the accumulated water.

11. The fuel cell system of claim 10, further comprising:

at least one valve to selectively connect the vacuum system to a manifold of the fuel cell stack.

12. The fuel cell system of claim 11, wherein said at least one valve selectively connects the vacuum system to a fuel inlet opening of the manifold.

13. The fuel cell system of claim 11, wherein said at least one valve selectively connects the vacuum system to an oxidant inlet opening of the manifold.

14. The fuel cell system of claim 10, further comprising:

a fuel processor to furnish fuel for the stack; and at least one valve to selectively communicate the fuel to the stack based on whether the vacuum is being applied.

15. The fuel cell system of claim 10, further comprising:

an air blower to furnish oxidant for the stack; and at least one valve to selectively communicate the oxidant to the stack based on whether the vacuum is being applied.

16. The fuel cell system of claim 10, further comprising:

a coolant subsystem to maintain a temperature of the stack near a constant temperature.

17. The fuel cell system of claim 16, wherein the constant temperature is near 70° C.

18. The fuel cell system of claim 10, wherein the vacuum system is adapted to apply the vacuum to anode regions of the stack.

19. The fuel cell system of claim 10, wherein the vacuum system is adapted to apply the vacuum to cathode regions of the stack.

20. The fuel cell system of claim 10, wherein the vacuum system is portable.

21. A method usable with a fuel cell system, the fuel cell system comprising a fuel cell stack that accumulates water produced by fuel cell reactions, the method comprising:

during operation of the fuel cell stack, intermittently reducing an operation pressure of the fuel cell stack to remove at least some of the accumulated water.

22. The method of claim 21, wherein the reducing comprises:

connecting a vacuum system to a manifold of the fuel cell stack.

23. The method of claim 21, further comprising:

maintaining the fuel cell stack near a constant temperature.

24. The method of claim 23, wherein the maintaining the fuel cell stack near the predefined temperature comprises:

regulating a coolant subsystem of the fuel cell system.

25. The method of claim 23, wherein the constant temperature is near 70° C.

26. The method of claim 21, further comprising:

shutting off a reactant flow to the stack before reducing the operating pressure.

27. The method of claim 21, wherein the reducing comprises:

reducing the operating pressure in anode regions of the stack.

28. The method of claim 21, wherein the reducing comprises:

reducing the operating pressure in cathode regions of the stack.

29. The method of claim 21, wherein the reducing comprises:

momentarily reducing the operating pressure at regular intervals.

* * * * *